United States Patent [19]

Duhe

[11] Patent Number: 4,575,829

[45] Date of Patent: Mar. 11, 1986

[54] METHOD AND APPARATUS FOR SOUND LEVEL DETERMINATION

[75] Inventor: Rand J. Duhe, The Woodlands, Tex.

[73] Assignee: Shell Oil Company, Houston, Tex.

[21] Appl. No.: 551,782

[22] Filed: Nov. 14, 1983

[51] Int. Cl.[4] .............................................. G01S 5/00
[52] U.S. Cl. ..................................... 367/129; 73/646; 367/117
[58] Field of Search ................. 73/645, 646, 647, 648; 367/6, 13, 117, 118, 128, 129; 343/450, 453, 463

[56] References Cited

U.S. PATENT DOCUMENTS 3,357,020  12/1967  Slifer, Jr. ............................. 343/453

OTHER PUBLICATIONS

Schneider, *Sound and Vibration*, vol. 9, No. 5, pp. 8 & 10, May 1975.

*Primary Examiner*—Richard A. Farley

[57] ABSTRACT

A method of determining both the level of sound occurring at a point in an area of interest and the location of the point. The level of sound at a point in the area of interest is sensed, and a first signal is transmitted from the point. This first signal is received at a first location related to the area of interest, and the direction relative to the first location from which the first signal was transmitted is determined. A second signal is transmitted from the first location which is indicative of the direction relative to the first location from which the first signal was transmitted. Similarly, the first signal is received at a second location related to the area of interest. The direction relative to the second location from which the first signal was transmitted is determined, and a third signal is transmitted from the second location which is indicative of the direction relative to the second location from which the first signal was transmitted. The second and third signals are received at the point and recorded in a correlatable manner with the level of sound sensed at the point.

6 Claims, 1 Drawing Figure

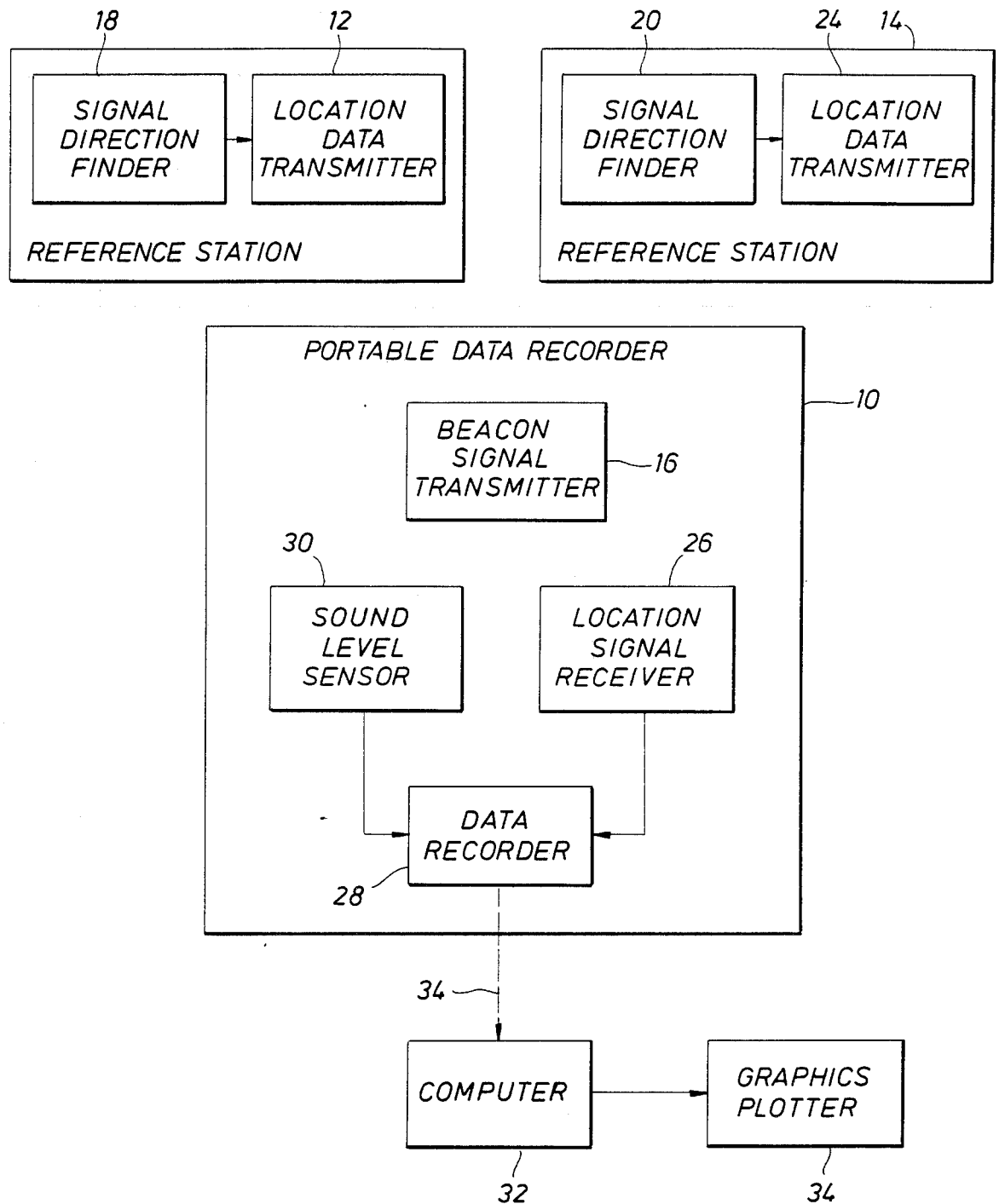

METHOD AND APPARATUS FOR SOUND LEVEL DETERMINATION

BACKGROUND OF THE INVENTION

This invention relates to determining the level of sound occurring at a point in an area of interest; a plurality of such sound level determinations can be used to prepare a sound level contour map for the area of interest. A prior art method of determining the sound level at a plurality of points within an area of interest has consisted of locating a predetermined point within the area of interest by measuring from a known point with a tape measure, measuring wheel or similar device and then recording the sound level sensed by a sound level meter or acoustic monitoring device at that predetermined location. Alternatively, an approximate location can be determined by using a plot plan and visual reference points associated with that plot plan. The prior art worker then measured again to determine the next predetermined point at which the sound level was to be measured. This process was repeated for many points located within the area of interest. However, this prior art method requires laborious and tedious effort on the part of the individual making the measurements which often results in diminished accuracy in the results of the survey. This foregoing method is generally used to obtain the sound level information at a plurality of points in the area of interest to create a sound level contour map. In the event that the objective is to obtain the location of the areas that exceed a certain level of sound, another method is employed which consists of having an individual walk around the area under test while observing the output of a sound level meter. When a point is reached at which the level of sound is equal to or greater than the predetermined limit, the worker then determines that location as discussed hereinabove. This latter method has the same shortcomings that the former method has, that is, it is time consuming and prone to inaccuracies.

Therefore, it is an object of the present invention to provide a method of and apparatus for expeditiously and accurately determining the level of sound occurring at a point in an area of interest.

SUMMARY OF THE INVENTION

In accordance with the present invention there is provided a method of determining both the level of sound occurring at a point in an area of interest and the location of the point. The level of sound at a point in the area of interest is sensed, and a first signal is transmitted from the point. This first signal is received at a first location related to the area of interest, and the direction relative to the first location from which the first signal was transmitted is determined. A second signal is transmitted from the first location which is indicative of the direction relative to the first location from which the first signal was transmitted. Similarly, the first signal is received at a second location related to the area of interest. The direction relative to the second location from which the first signal was transmitted is determined, and a third signal is transmitted from the second location which is indicative of the direction relative to the second location from which the first signal was transmitted. The second and third signals are received at the point and recorded in a correlatable manner with the level of sound sensed at the point.

In addition, the present invention provides an apparatus for determining the level of sound occurring at a point in an area of interest comprising a portable data recording means, a first reference means and a second reference means. The portable data recording means comprises means for sensing the level of sound at the point in the area of interest at which the portable data recording means is positioned, means for transmitting a first signal, and means for receiving second and third signals and for recording such signals in a correlatable manner with the sound level sensed by the sensing means at the point at which the portable data recording means is positioned. The first reference means is positioned at a first location in relation to the area of interest and comprises first means for determining the direction relative to the first location from which the first signal was transmitted and means for transmitting a second signal indicative of the direction determined by the first signal direction determining means. The second reference means is positioned at a second location in relation to the area of interest and comprises a second means for determining the direction relative to the second location from which the first signal is transmitted and means for transmitting a third signal indicative of the direction determined by the second signal direction determining means.

In the preferred embodiment of the present invention the system uses triangulation of electronic signals to associate the sound level readings with the location of the measurements. Each of the reference means or stations is positioned at a point related to the area of interest, such as proximate or in the area of interest, and includes an electronic signal direction finder and a signal transmitter which transmits a signal indication of the direction sensed by the signal direction finder. A portable data recording means includes a sound level meter or acoustic monitoring device, an electronic signal transmitter or beacon, an electronic receiver for receiving the signals transmitted by the reference stations and a recording device. The sound level meter measures the sound level and provides these to the data recording device. The beacon signal from the transmitter associated with the sound level meter transmits a signal which is detected by the reference stations. The signal direction finder and transmitter is associated with each reference station provide simultaneous but separate signals which are indicative of the direction of the portable data recording means in relation to the respective reference stations. These signals are received and sorted by the receiver associated with the sound level meter and are stored concurrently with the sound level meter output or in any other manner that provides appropriate correlation.

The system of the present invention can be used, for example, to acquire data for the preparation of sound level contours of a predetermined area. In this application both reference stations are situated at known points within or proximate to the area to be studied. The portable data recording means is then traversed throughout the subject area by the surveyor. The sound level readings are recorded concurrently with the corresponding location coordinates. The data collected can be later inputted to a computer graphics package which can, for example, overlay contour tracings onto existing scale drawings or maps of the subject area. Accordingly, the system of the present invention provides a compilation of sound level measurements in a plurality of electronically determined positions thereby eliminating the tedious measurements required by the prior art methods and also eliminating the inaccuracies inherent in such physical measurements.

Other objectives, advantages and applications of the present invention shall be made apparent by the following detailed description of the preferred embodiments.

BRIEF DESCRIPTION OF THE DRAWINGS

The FIGURE is a schematic block diagram illustrating the sound level detection system of the present invention.

DETAILED DESCRIPTION OF THE PREFERRED EMBODIMENTS

Referring to the FIGURE, the sound level detection system of the present invention includes a portable data recorder 10 which is moved by an operator through the area under test to record the sound levels and locations as discussed hereinbelow. Reference stations 12 and 14 are positioned at known points within or proximate to the area to be surveyed. Portable data recorder 10 has a beacon signal transmitter 16 which transmits a signal that is detected by signal direction finder 18 of reference station 12 and also by signal direction finder 20 of reference station 14. Signal direction finder 18 determines the location of portable data recorder 10 in relation to reference station 12. Signal direction finder 18 provides a signal indicative of this direction to location data transmitter 22 which, in turn, transmits a signal indicative of such direction that is detected by location signal receiver 26 of portable data recorder 10. Similarly, signal direction finder 20 of reference station 14 employs the signal from beacon signal transmitter 16 to determine the location of portable data recorder 10 in relation to reference station 14. This information is provided by signal direction finder 20 to location signal transmitter 24 which transmits a signal indicative of this location to portable data recorder 10. The signal transmitted by location data transmitter 24 is detected by location signal receiver 26 which is connected to data recorder 28. Portable data recorder 10 also includes sound level sensor 30 which can be, for example, a sound level meter or acoustic monitoring device, for sensing the level of sound at the present location of portable data recorder 10. Sound level sensor 30 is connected to data recorder 28 which concurrently records the sound level signal provided by sound level sensor 30 and the location signals provided by location signal receiver 26. After the operator has traversed the area of interest with portable data recorder 10, the data recorded by data recorder 28 can be provided to a computer 32 as indicated by dotted arrow 34. The data can be manipulated by computer 32 in combination with graphics plotter 34, for example, to overlay contour tracings onto existing scale drawings or maps of the surveyed area.

In an alternative embodiment in which it is desired to record only the points in the area being surveyed that have a sound level that is equal to or greater than some predetermined limit, sound level sensor 30 can include a comparator or level detection circuit which actuates data recorder 28 to record both the sound level signal and also the location signals provided by location signal receiver 26 only when the sound level is equal to or greater than the predetermined level.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of determining both the level of sound occurring at a point in an area of interest and the location of the point, said method comprising the steps of: sensing the level of sound at a point in the area of interest; transmitting a first signal from said point; receiving said first signal at a first location related to said area of interest; determining the direction relative to said first location from which said first signal was transmitted; transmitting a second signal indicative of the direction relative to said first location from which said first signal was transmitted; receiving said first signal at a second location related to said area of interest; determining the direction relative to said second location from which said first signal was transmitted; transmitting a third signal indicative of the direction relative to said second location from which said first signal was transmitted; receiving said second and third signals at said point, and recording in a correlatable manner said second and third signals and the level of sound sensed at said point.

2. A method as recited in claim 1, further comprising repeating each of said steps for a plurality of points in said area of interest and generating a plot of the sound level for the area of interest from the plurality of second and third signals and sound levels recorded in said recording step for said plurality of points.

3. An apparatus for determining the level of sound occurring at a point in an area of interest, said apparatus comprising: a portable data recording means comprising means for sensing the level of sound at the point in said area of interest at which said portable data recording means is positioned, means for transmitting a first signal, and means for receiving second and third signals and recording in a correlatable manner the second and third signals and the sound level sensed by said sensing means at said point at which said portable data recording means is positioned; a first reference means positioned at a first location related to said area of interest and comprising first means for determining the direction relative to said first location from which said first signal was transmitted and means for transmitting a second signal indicative of the direction determined by said first signal direction determining means; and a second reference means positioned at a second location in relation to said area of interest and comprising second means for determining the direction relative to said second location from which said first signal was transmitted and means for transmitting a third signal indicative of the direction determined by said second signal direction determining means.

4. An apparatus as recited in claim 3, further comprising means for generating a plot of the sound level for the area of interest from said second and third signals and sound levels recorded by said receiving and recording means.

5. An apparatus as recited in claim 3, wherein at least one of said first and second locations is located within the area of interest.

6. An apparatus as recited in claim 3, wherein said sensing means actuates said receiving and recording means to record the second and third signals and the sound level sensed by said sensing means at said point only when the sound level sensed by said sensing means is equal to or greater than a predetermined level of sound.

* * * * *